W. H. STEVENS.
ELECTROPNEUMATIC BRAKE.
APPLICATION FILED OCT. 25, 1919.

1,402,267. Patented Jan. 3, 1922.

Inventor:
William Hatton Stevens,
By Chas. N. Butler
Attorney.

UNITED STATES PATENT OFFICE.

WILLIAM HATTON STEVENS, OF PHILADELPHIA, PENNSYLVANIA.

ELECTROPNEUMATIC BRAKE.

1,402,267.     Specification of Letters Patent.     Patented Jan. 3, 1922.

Application filed October 25, 1919. Serial No. 333,233.

*To all whom it may concern:*

Be it known that I, WILLIAM HATTON STEVENS, a citizen of the United States, residing in the city of Philadelphia, county of Philadelphia, and State of Pennsylvania, have invented certain new and useful Improvements in Electropneumatic Brakes, of which the following is a specification.

This invention relates to improvements in electropneumatic brakes whereby a simple construction provides efficient means adapted to effect the simultaneous application and the simultaneous release of all the brakes on all the cars in the train.

The pneumatic brake systems now in general use are defective because, amongst other reasons, great care is required in operating the brakes, all the brakes cannot be applied or released simultaneously, a stop or start cannot be made as quickly as may be desired, there is a bunching of the cars with objectionable shocks and liability to wrecks in stopping, and there is a tendency to disrupt the train in starting.

The use of electro-pneumatic brakes have been proposed to overcome these objections in pneumatic systems but they are subject to various objections, particularly in the complications of such systems, as in the wiring.

It is a primary object of my improvements to provide a simple and efficient brake system, avoiding the foregoing defects of former systems.

The improvements comprehend the use on each car in a train of a release magnet-valve, a service magnet-valve, an emergency magnet-valve, and an emergency switch, in combination with simple and positive electric means for automatically selecting and operating the magnets from a source of electric energy, by alternating currents of different frequencies, through a brake valve and switch having electric contacts closing different circuits for each of the pneumatic positions whereby the electro-magnetic valve operating mechanisms are excited through a single train wire and a single return conductor which latter may be the ground.

The characteristic features of the invention are embodied in the construction set out in the following description and the accompanying drawings in illustration thereof.

Figure 1:
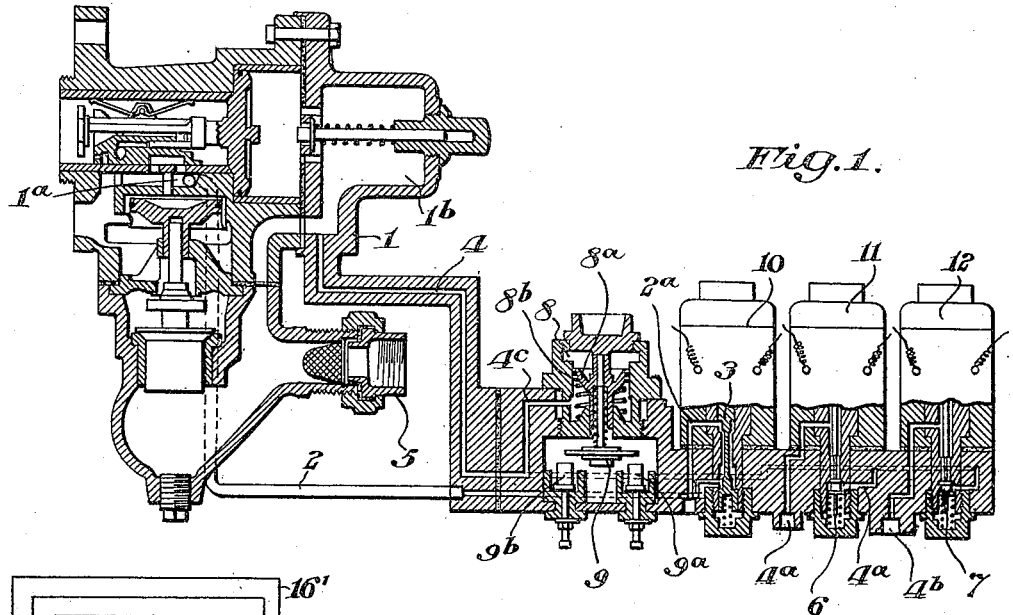
Figure 2:
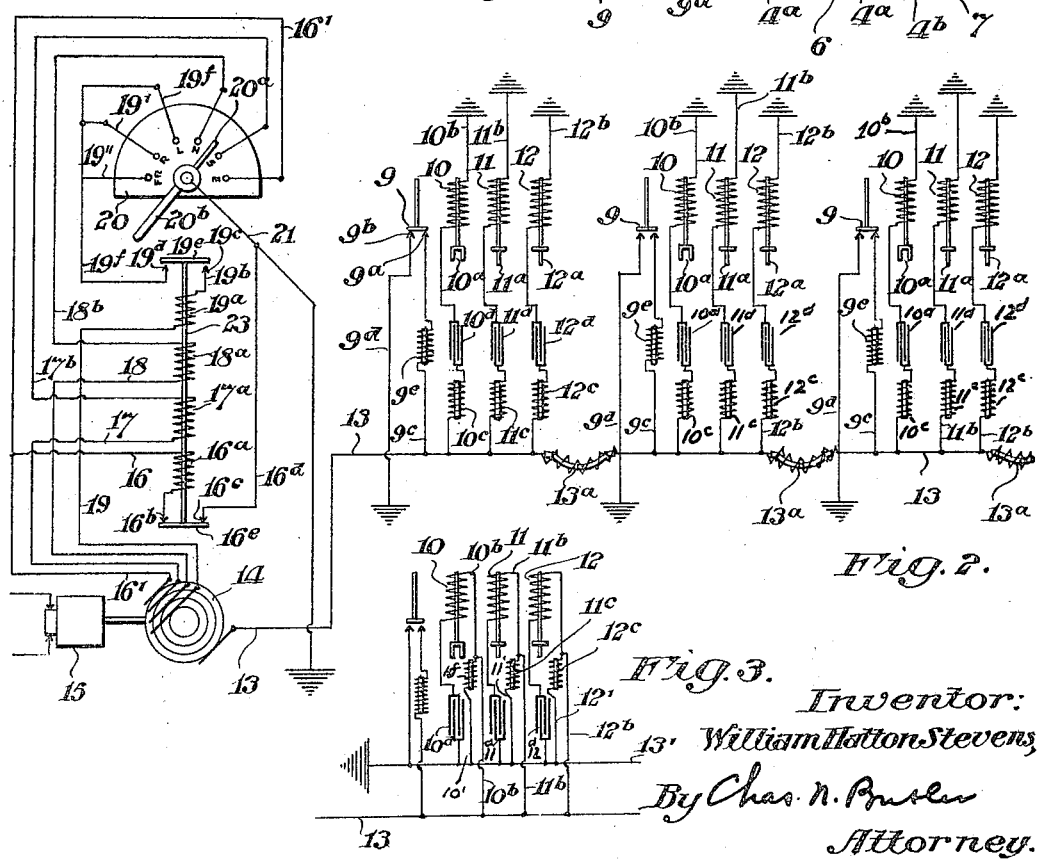
Figure 3:
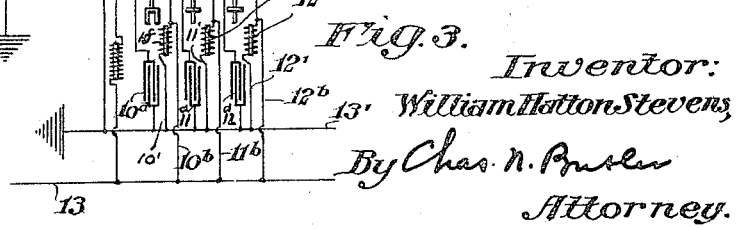

In the drawings, Fig. 1 is a diagrammatic view, mainly in section, of a quick action type of triple valve provided with an emergency switch, and with release, service and emergency magnet-valves; Fig. 2 is a diagrammatic view of the electrical equipment, and Fig. 3 is a diagrammatic view of a modification in the electrical equipment.

The mechanism illustrated comprises the triple valve 1 from the exhaust port $1^a$ of which the conduit 2 leads to the atmosphere through the release valve conduit $2^a$ controlled by the release valve 3. A conduit 4 leads from the triple valve chamber $1^b$ (connected with the brake pipe 5) to the atmosphere, through the service valve conduit $4^a$ controlled by the service valve 6 and through the emergency valve conduit $4^b$ controlled by the emergency valve 7. The conduit 4 is connected through the conduit $4^c$ to the emergency switch cylinder 8 containing the piston $8^a$ which is normally elevated by the spring $8^b$, the piston carrying a switch bridge 9 adapted for making and breaking a circuit through contacts $9^a$ and $9^b$ (Fig. 1).

The valves 3, 6 and 7, with which each car of the train may be provided, are connected with and operated by the respective solenoid plungers $10^a$, $11^a$ and $12^a$ of the electromagnets 10, 11 and 12.

A train wire 13, composed of sections adapted to be broken and joined by couplings $13^a$ between the cars, is connected with the ground through the electromagnets 10, 11 and 12 of each unit by the parallel conductors $10^b$, $11^b$ and $12^b$ containing the respective reactances $10^c$, $11^c$ and $12^c$ and condensers $10^d$, $11^d$ and $12^d$, and by the conductors $9^c$ and $9^d$ through the switch bridge 9 when in engagement with the contacts $9^a$ and $9^b$, the conductors $9^c$ containing the respective reactances $9^e$.

The amount of inductance in the respective reactances and electromagnets and the capacity of the condensers, arranged in the respective series, are of such value as to give voltage resonance at the different frequencies which are supplied to the different series as required to energize the release, service and emergency electromagnets 10, 11 and 12 and operate the respective valves 3, 6 and 7.

An alternating current generator 14, wound to produce four distinct current frequencies of the same voltage, is operated at a constant speed by a prime mover or an electric motor 15, and supplies current to the respective conductors 13, 16, 17, 18 and 19, (of different frequencies in the respective conductors 16, 17, 18 and 19) under control of a switch 20, the latter having a blade $20^a$ operated by the brake lever $20^b$ and the points E, S, H, L, R and FR corresponding respectively to the emergency, service, holding lap, running and full release positions of the brake.

The conductor 16 is connected through an electromagnet or solenoid coil $16^a$ with a terminal and switch contact $16^b$ which is connected and disconnected with relation to the contact and terminal $16^c$ of a conductor $16^d$ by a bridge $16^e$, the conductor $16^d$ being connected with a conductor 21 which connects the blade $20^a$ to ground. A conductor $16'$ connects the conductor 16 with the point E.

The conductor 17 is connected through a solenoid coil $17^a$ with a conductor $17^b$ which is connected with the point S.

The conductor 18 is connected through a solenoid coil $18^a$ with the conductor $18^b$ which is connected with the point H.

The conductor 19 is connected through the solenoid coil $19^a$ and a conductor $19^b$ with a terminal or switch point $19^c$ which is connected and disconnected with relation to the terminal $19^d$ by a bridge $19^e$, the point $19^d$ being connected by a conductor $19^f$ with the point L. Conductors $19'$ and $19''$ connect the conductor $19^f$ with the respective points R and FR.

A plunger 23, common to the solenoid coils $16^a$, $17^a$, $18^a$ and $19^a$, connects the bridges $16^e$ and $19^e$.

In running, with the blade $20^a$ on the point R, the contacts $19^c$ and $19^d$ are connected by the bridge $19^e$ while the points $16^b$ and $16^c$ are disconnected by the retraction of the bridge $16^e$ therefrom, the current now passing through the coil $19^a$ being insufficient to elevate the plunger 23. Now a current having a frequency too low to operate any of the valve magnets 10, 11 and 12, is impressed upon the train wire 13, a circuit being closed (but not resonant) from the generator 14 to ground, on one side, through the conductors 13, $10^b$, $11^b$ and $12^b$ with the elements contained therein and, on the other side, through the conductors 19, $19^a$, $19^b$, $19^e$, $19^f$, $19'$, $20^a$ and 21.

If the blade $20^a$ be in the lap position, on the point L, or in the full running position, on the point FR, the current follows the same circuits excepting the substitution of the respective parallel conductors $19''$ or $19^f$ for $19'$.

If any car in the train should go into pneumatic emergency, the pressure in the brake pipe 5 would be rapidly reduced to atmospheric and the piston $8^a$ would be forced down, thus effecting the connection by the bridge 9 of the normally separated contacts $9^a$ and $9^b$, thus providing a short circuit from the conductor 13 to ground through the conductors $9^c$, 9 and $9^d$ under control of the reactance $9^e$. The reduction in resistance thus effected causes current to flow through the conductors 19, $19^a$, $19^b$, $19^e$, $19^f$, $19'$, $20^a$ and 21, which energizes the coil $19^a$ so that the plunger 23 is elevated, thus disconnecting the points $19^c$ and $19^d$ by the withdrawal of the bridge $19^e$ therefrom and connecting the points $16^b$ and $16^c$ through the bridge $16^e$. Thereupon current flows from the generator 14 to ground through the conductors 16, $16^a$, $16^c$, $16^d$ and 21, impressing upon the train wire 13 the current frequency required for exciting all of the emergency magnets 12 so as to operate all of the emergency valves 7 by the current from the train wire through the conductors $12^b$ with the parts therein.

In the emergency application of the brakes, due to setting the brake lever $20^b$ with the blade $20^a$ on the point E, a circuit is closed to ground from the generator 14 through the conductors $16'$, 16 and $20^a$, impressing the frequency in the train wire 13 and its connections $12^b$ which is required for exciting the magnets 12 and operating the emergency valves as previously described.

In the service application, the blade $20^a$ having been set on the point S when the bridge $19^e$ connects the points $19^c$ and $19^d$, current flows from the generator 14 to ground through the parts 17, $17^a$, $17^b$, $20^a$ and 21. The current frequency necessary for effecting the service application is now impressed on the train wire 13 and the conductors $11^b$, thus exciting the magnets 11 so as to operate the service valves 6.

If the brake lever 20 be set at the holding position, with the blade $20^a$ on the point H, current flows between the ground and the generator 14, on one side of the latter, through the conductors 13, $9^c$ and $9^d$ and on the other side through the conductors 18, $18^a$, $18^b$, $20^a$ and 21, the frequency being impressed on the electromagnets 11 that will maintain the positions of the valves 6 for continuing the application of the brakes.

In Fig. 3 is shown an alternative wiring system in which the conductors $10^b$, $11^b$ and $12^b$, connecting the train wire 13 with a return wire $13'$, have the respective reactances $10^c$, $11^c$ and $12^c$ connected in parallel with the respective electromagnets 10, 11 and 12 and with the condensers $10^d$, $11^d$ and $12^d$ therein, by placing such reactances in the respective branch circuits 10', 11' and 12', as distinguished from the serial arrangement shown in Fig. 2, for obtaining the desired impedances and current resonances for operating the electromagnets 10, 11 and 12.

It is to be understood that the current which passes through the coils $17^a$, $18^a$ and $19^a$ in normal operation is not sufficient to move the plunger 23, and that the current which passes through the coil $16^a$ is insufficient to hold the plunger elevated in the holding position of the brake valve, with the blade $20^a$ on the point H, when the circuit through the coil is opened.

Having described my invention, I claim:

1. In an electro-pneumatic brake system, the combination with the pneumatic brake mechanism comprising valves for effecting operations of the brakes, of electrical mechanism for electrically operating said valves by alternating currents of different frequencies.

2. In an electro-pneumatic brake system, the combination with the pneumatic brake mechanism comprising valves for effecting respectively different operations of the brakes, of electrical mechanism comprising electromagnets for selectively operating said valves and means for impressing on the respective electromagnets alternating currents of different frequencies whereby said electromagnets are selectively excited to selectively operate said valves.

3. In an electro-pneumatic brake system, the combination with the pneumatic brake mechanism comprising valves for effecting respectively different operations of the brakes, of electrical means comprising circuits of different resonance provided with electromagnets for selectively operating said valves respectively, and an alternating current generator adapted for impressing currents of different frequencies in the respective circuits to effect the operation of the respective valves.

4. In an electro-pneumatic brake system, the combination with the connected triple valve, release valve, service valve and emergency valve, of means comprising a circuit provided with a switch, means, connected with the pneumatic brake mechanism for pneumatically operating said switch, circuits provided with means comprising electromagnets for selectively operating said valves, and means for impressing currents of different frequencies in said circuits containing said electromagnets to effect the operations of said valves respectively.

5. In an electro-pneumatic brake system, the combination with the pneumatic brake mechanism comprising a brake valve lever, a triple valve, a release valve, a service valve and an emergency valve, of electrical mechanism comprising circuits of different impedance provided with electromagnets for selectively operating the release, service and emergency valves, and means comprising a switch coordinated with said brake valve lever and a generator whereby alternating currents of different frequencies are impressed in the respective circuits to excite the respective electromagnets and operate the respective valves.

6. In an electro-pneumatic brake system, the combination of electromagnetically operated brake valves, means for manually operating the controlling valve, a switch operated by the operation of said means, circuits comprising means for selectively operating said valves first named, and electrical mechanism comprising a generator and means for distributing current therefrom under control of said switch so as to impress in said circuits alternating currents of different frequencies adapted for operating said valves first named.

7. In an electro-pneumatic brake system, the combination with the mechanism comprising a release valve, a service valve, an emergency valve, switch operating means, a triple valve, and a conduit connecting said triple valve with the atmosphere under control of said release, service and emergency valves respectively, of circuits comprising electromagnets having plungers operated by different frequency currents for operating said last named valves respectively, a circuit comprising an emergency switch, fluid pressure mechanism comprising a conduit connected with said train pipe for operating said switch, a train circuit connected with the circuits aforesaid, and menas for impressing in said train circuit alternating currents of different frequencies for effecting the operation of said plungers.

8. In an electro-pneumatic brake system, the combination with the pneumatic mechanism comprising a brake pipe, a triple valve connected therewith, a conduit connected with said brake pipe through said valve, said conduit having communications with the atmosphere, electromagnetic valves for controlling said communications, and pneumatic means comprising a piston and conduit connected with said brake pipe, of a circuit comprising a switch operated by said piston, circuits having means energized by different frequency currents for operating said electromagnetic valves selectively, a train circuit connected with the circuits aforesaid and means comprising a generator, a switch and electromagnetically operated means for impressing different frequency currents in said train circuit.

9. In an electro-pneumatic brake system, the combination with the pneumatic mechanism comprising a plurality of sets of valves, of a plurality of sets of circuits comprising electromagnetic mechanisms respectively excited by currents of different frequencies to operate the respective valves, a plurality of circuits respectively comprising switches and associated with the respective sets of circuits aforesaid, electro-pneumatic means for effecting the operation of said switches simultaneously, a main circuit having sections with which the respective sets of circuits aforesaid are connected in parallel relation, and means comprising a source of electric energy for impressing alternating currents of different frequencies in said main circuits to excite said electromagnetic mechanisms and operate said valves selectively.

10. In an electro-pneumatic brake system, a generator having windings for producing alternating currents of several frequencies, having on one side thereof a main circuit and on the other side a plurality of circuits comprising electromagnetic coils through which current of different frequencies are transmitted, circuits aforesaid containing automatic switches, a solenoid plunger excited by said coils to operate said switches, a manually operated switch for controlling said circuits, a plurality of circuits containing electromagnetic coils of different resonance connected with said main circuit, solenoid plungers operated by said coils last named, valves operated by said plungers, a circuit containing a switch connected with said main conductor, and mechanism for operating said last named switch automatically.

11. In an electro-pneumatic brake system, the combination of the connected release valve, service valve and emergency valve; a switch having release, service and emergency contact points and a coacting contact member operatively connected with said brake valve; an alternating current generator having windings for producing currents of different frequencies; a train wire connected with said generator; parallel circuits connected with said train wire and provided respectively with electromagnetic mechanism tuned to be excited respectively by said different frequency currents to operate said release, service and emergency valves; a circuit controlled by said contact member in which said generator impresses the frequency current for operating said emergency valve; a circuit controlled by said contact member in which said generator impresses the frequency current for operating said service valve; a circuit controlled by said contact member in which said generator impresses the frequency current for operating said release valve and an electro-pneumatic switch for controlling said circuit last named.

12. In an electro-pneumatic brake system, the combination of the connected triple valve, release valve, service valve, emergency valve, and pneumatic switch operating mechanism; a switch having contact points corresponding to the release, holding, service, and emergency positions of said valves and a coacting contact member; an alternating current generator having windings for producing currents of different frequencies; a train wire connected with said generator; parallel circuits connected with said train wire and provided respectively with electromagnetic mechanisms tuned to be excited respectively by different frequency currents aforesaid to operate said release, service and emergency valves; a circuit controlled by said contact member in which said generator impresses the frequency current for operating said emergency valve; a circuit controlled by said contact member in which said generator impresses the frequency current for operating said service valve; a circuit controlled by said contact member in which said generator impresses the frequency current for operating said release valve, and a circuit controlled by said contact member in which said generator impresses a frequency current that is non-resonant to said electromagnetic mechanisms.

13. In an electro-pneumatic brake system, the combination of the connected triple valve, release valve, service valve, emergency valve and pneumatic switch operating mechanism; a switch having contact points corresponding to the emergency, service, holding, lap and running positions of said valves and a coacting contact member; an alternating current generator having windings for producing currents of different frequencies; a train wire connected with said generator; parallel circuits connected with said train wire, parallel circuits aforesaid being respectively provided with electromagnetic mechanisms tuned to be excited respectively by different frequency currents aforesaid to operate said release, service and emergency valves; and circuits controlled by said contact member in which said generator impresses the different frequency currents whereby said release, service and emergency valves are operated and the brakes are gradually released.

14. In an electro-pneumatic brake system, an alternating current generator having windings adapted for producing currents of different frequencies; a train wire connected with said generator; a switch having a plurality of contact points and a coacting contact member; a conductor containing a coil and a circuit breaker connected with points aforesaid in which said generator impresses a frequency current aforesaid; a conductor containing a coil connected with a point aforesaid in which said generator impresses a second frequency current; a conductor containing a coil connected with a point aforesaid in which said generator impresses a third frequency current; a circuit containing a coil and a circuit breaker connected with a point aforesaid in which said generator impresses a fourth frequency current; a plunger passing through said coils and connecting said circuit breakers; and a conductor connecting a point aforesaid with said last named conductor between the circuit breaker therein and said generator.

In testimony whereof I have hereunto set my hand, this 24 day of October, 1919.

WILLIAM HATTON STEVENS.